(12) United States Patent
Shinmura et al.

(10) Patent No.: US 7,935,369 B2
(45) Date of Patent: May 3, 2011

(54) GERMINATED BROWN RICE

(75) Inventors: Hiroto Shinmura, Yokohama (JP); Kota Nakagawa, Yokohama (JP); Chie Sasaki, Yokohama (JP); Hiromichi Aoto, Yokohama (JP); Misaki Onishi, Yokohama (JP)

(73) Assignee: Fancl Corporation, Kanagawa (JP)

( * ) Notice: Subject to any disclaimer, the term of this patent is extended or adjusted under 35 U.S.C. 154(b) by 840 days.

(21) Appl. No.: 11/568,850

(22) PCT Filed: May 11, 2005

(86) PCT No.: PCT/JP2005/008620
§ 371 (c)(1),
(2), (4) Date: Jan. 17, 2007

(87) PCT Pub. No.: WO2005/110116
PCT Pub. Date: Nov. 24, 2005

(65) Prior Publication Data
US 2007/0190222 A1    Aug. 16, 2007

(30) Foreign Application Priority Data

May 14, 2004 (JP) .................................. 2004-145330
Jun. 3, 2004 (JP) .................................. 2004-165922

(51) Int. Cl.
A23G 1/02 (2006.01)
A23L 1/212 (2006.01)
A23L 1/00 (2006.01)
A23L 1/182 (2006.01)
A23L 1/10 (2006.01)

(52) U.S. Cl. .......... 426/44; 426/615; 426/618; 426/627; 426/455; 426/456; 426/460; 426/459

(58) Field of Classification Search .................. 426/627, 426/455, 456, 44, 460, 461, 459, 465, 618, 426/61
See application file for complete search history.

(56) References Cited

U.S. PATENT DOCUMENTS

| 6,630,193 B2 * | 10/2003 | Aoto et al. ..................... 426/627 |
| 2003/0215542 A1 | 11/2003 | Buchanan et al. |
| 2006/0263499 A1 | 11/2006 | Satake et al. |

FOREIGN PATENT DOCUMENTS

| AU | 2004261101 A1 | 2/2005 |
| JP | 07-255393 | 10/1995 |
| JP | 07-289180 | 11/1995 |
| JP | 08-116895 | 5/1996 |
| JP | 08-280394 | 10/1996 |
| JP | 2000-050818 | 2/2000 |
| JP | 2000-217520 | 8/2000 |
| JP | 2002-159269 | 6/2002 |
| JP | 2002-291423 | 10/2002 |
| JP | 2002-354992 | 12/2002 |
| JP | 2003-219847 | 8/2003 |

OTHER PUBLICATIONS

Tao, Biochemical Studies on Rice Starch. II. Temoerature Effects on the Germination of Rice Seeds in Darkness, Published Feb. 28, 1930.*
Tran, Analysis of the tastes of brown rice and milled rice with different milling yields using a taste sensing system. Apr. 9, 2004.*
Evelyn P. Palmiano, et al. Biochemical Changes in the Rice Grain during Germination, Plant Physiol (1972) 49, 751-756.*
Australian Office Action issued on Jan. 20, 2010 by the Australian Patent Office for the counterpart Australian Patent Application No. 2005244347.
Supplemental Search Report for a counterpart European Patent Application No. 05 73 9328 issued by European Patent Office dated May 3, 2010.

* cited by examiner

*Primary Examiner* — Callie E Shosho
*Assistant Examiner* — Lela S Williams
(74) *Attorney, Agent, or Firm* — Knobbe Martens Olson & Bear LLP

(57) ABSTRACT

It is intended to provide germinating brown rice having an improved taste and cooking characteristics. Namely, germinating brown rice containing at least a direct reducing sugar component in an elevated amount compared with the starting brown rice and, if necessary, further containing α-starch prepared by the gelatinization of a part of starch.

10 Claims, 5 Drawing Sheets

Comparative Example 1  Example 2

GERMINATED BROWN RICE

This application is the U.S. National Phase under 35 U.S.C. §371 of International Application PCT/JP2005/008620, filed May 11, 2005, which claims priority to Japanese Patent Application No. 2004-145330, filed May 14, 2004 and Japanese Application No. 2004-165922, filed Jun. 3, 2004. The International Application was not published under PCT Article 21(2) in English.

TECHNICAL FIELD

This invention relates to germinated brown rice. More specifically, it relates to germinated brown rice offering excellent taste and cooking property.

BACKGROUND TECHNOLOGY

Brown rice is a richer source of nutrients compared to polished white rice, and contains a majority of nutrients we need. In particular, brown rice contains high levels of dietary fiber, vitamin Bs and vitamin E whose physiological benefits are drawing the attention in recent years (refer to Patent Literature 1, Patent Literature 2, etc.).

While being an excellent food material as described above, brown rice has several drawbacks owing to the fact that its surface is covered by the so-called "bran layer," which forms a hard outer layer containing a lot of oil and fiber. Since the aforementioned outer layer prevents heat permeation and water absorption when brown rice is cooked at normal pressures, starch does not gelatinize sufficiently, and the outer layer structure does not soften or break down sufficiently. For these reasons, brown rice cooked at normal pressures is hard and dry, and is therefore considerably less tasteful compared to polished white rice after cooking. To resolve these drawbacks, brown rice is commonly cooked under higher pressures. However, higher pressures cause vitamins and certain other nutrients vulnerable to high temperatures and pressures to partially break down, and heating until the outer layer of brown rice becomes soft causes other parts of rice to gelatinize. As a result, it has been difficult to produce high-quality brown rice that has good sensation in the mouth and is effectively digested/absorbed when cooked.

It is known that soft cooked brown rice can be obtained by soaking brown rice for an appropriate time in warm water of temperatures between 5 and 50° C., or more preferably between 20 and 40° C., to cause the rice to germinate, and then cooking this germinated rice at normal or higher pressures (Patent Literature 3). This germinated brown rice, or brown rice that underwent the germinating operation and is showing signs of germinating as a result, is called "germinated brown rice" or "germinated rice," and is clearly differentiated from brown rice. However, the germinating process of brown rice causes the rice to lose constituents that contribute to good rice taste, either through the metabolic action of brown rice itself or due to water existing on the exterior surface of the rice. Also, growth of bacteria in the brown rice triggers fermentation, thus generating fermentation smell or other foul smell that will remain with the rice. Also with such germinated brown rice, breakdown of starch and other constituents progresses excessively over time due to the action of enzymes contained in the rice, which consequently reduces the quality of rice as food material.

To resolve the aforementioned problems, various methods have been attempted to germinate brown rice, such as using warm water containing bactericidal agent or weak electrolytic salt water; using running water; or using warm water and replacing it periodically (Patent Literature 4). However, use of chemicals such as bactericidal agent presents problems in terms of negative effects from residual substances and retention of chemical odor. Also, the method to germinate brown rice in warm water under periodic replacement or in running water results in a lot of wasted water and energy, and requires complex manufacturing controls. Patent Literature 6 discloses a technology to germinate brown rice under an environment of 100% humidity, but this technology still does not make germinating easy, and brown rice must be given warm-water shower in an interim stage, as described in Patent Literature 6. As a result, this technology fails to improve the taste and cooking property of brown rice.

Another method being employed is to germinate brown rice and then dry the rice. However, brands of dry germinated brown rice on the market exhibit a common problem, which is that the brown rice absorbs water in the germinating process and the swollen germinated rice cracks in the drying process. Cracked rice is not tasty when cooked. The inventors earlier proposed a method to heat, in a humid environment, germinated brown rice immediately after germinating (Patent Literature 5).

Following the aforementioned earlier invention, the inventors have continued their study and development in earnest to provide germinated brown rice offering improved taste and cooking property and eventually come up with an effective solution, which is proposed in the present invention.

Patent Literature 1: Japanese Patent Laid-open No. Hei 8-280394
Patent Literature 2: Japanese Patent Laid-open No. 2003-219847
Patent Literature 3: Japanese Patent Laid-open No. 2000-050818
Patent Literature 4: Japanese Patent Laid-open No. 2000-217520
Patent Literature 5: Japanese Patent No. 3423931
Patent Literature 6: Japanese Patent Laid-open No. 2002-291423

SUMMARY OF THE INVENTION

Problems to be Solved by the Invention

An object of the present invention is to provide germinated brown rice offering excellent taste and improved cooking property.

Means for Solving the Problems

The inventors examined in earnest to solve the aforementioned problems. Specifically, the inventors studied the taste of germinated brown rice in earnest and examined the constituents that may affect taste. As a result, the inventors found that increasing the contents of direct reducing sugar and sucrose, or increasing their residual contents, would improve the taste of rice.

Naturally, brown rice contains only a small amount of direct reducing sugar. As for water-soluble sucrose, the conventional production methods cause germinated brown rice to release and lose sucrose or otherwise suffer significant loss of sucrose content in the soak and shower steps. Sucrose is mostly contained in the germ of brown rice, and therefore polished white rice contains little sucrose. It is known that starch changes to sugar in the germinating process, but the relationship between the taste of germinated brown rice and the contents of sucrose and direct reducing sugar in the rice has not received much attention. The inventors focused on this relationship and completed the present invention that improves the taste of germinated brown rice at the time of actual consumption by controlling the sucrose and direct reducing sugar contents, and also by adjusting the gelatinization degree of starch, thereby enhancing the cooking property of rice. The germinated brown rice proposed by the present invention also offers improved utility through control of other factors affecting the cooking property of rice.

The key configurations of the present invention are explained below:
(1) Germinated brown rice characterized by containing, as its constituents, at least direct reducing sugar content increased from the level in the material brown rice, and alpha starch produced through partial gelatinization of starch.
(2) Germinated brown rice according to (1), characterized by containing as its constituent a high level of sucrose whose loss through dissolution in water is suppressed.
(3) Germinated brown rice according to (1) or (2), characterized in that the direct reducing sugar content is 0.15 g or more per 100 g of the dry weight of germinated brown rice, and gelatinized alpha starch in the germinated brown rice accounts for 9 to 40% of the total starch content when measured by the BAP method.
(4) Germinated brown rice according to any one of (1) to (3), characterized in that the sucrose content is 0.5 g or more per 100 g of the dry weight of germinated brown rice.
(5) Germinated brown rice according to any one of (1) to (4), characterized in that the water content is between 10 and 20%.
(6) Germinated brown rice according to any one of (1) to (5), characterized in that the water absorption ratio after soaking for 24 hours in 30° C. water is 35 to 60 percent by weight.
(7) Germinated brown rice according to any one of (1) to (6), characterized in that the ratio of cracked rice is 50% or below.
(8) Germinated brown rice according to any one of (1) to (7), for cooking combined with white rice.
(9) Germinated brown rice characterized by containing, as its constituents, at least 0.15 g or more of direct reducing sugar and 0.5 g or more of sucrose per 100 g of the dry weight of germinated brown rice.

EFFECTS OF THE INVENTION

The present invention achieved germinated brown rice containing a high level of direct reducing sugar. By increasing the content of direct reducing sugar, the taste of germinated brown rice is improved. A higher content of direct reducing sugar is also an indicator that the molecules of high-molecular starch as well as hemicellulose and lignins constituting the bran layer have been broken down, because an increased level of direct reducing sugar means that various enzymes have acted upon these high molecules in the germinating process and caused them to change to low molecules. Because of this change of high molecules constituting the bran layer to low molecules, the hardness of rice and sensation felt in the mouth—which are traditionally considered drawbacks of brown rice—have been improved, and germinated brown rice offering virtually same taste as white rice after cooking has been achieved.

The germinated brown rice proposed by the present invention retains, instead of losing, the aforementioned direct reducing sugar, sucrose, vitamins and minerals that are normally lost in the traditional germinating process through dissolution in water. Therefore, this germinated brown rice maintains excellent taste and nutrients. Also, this germinated brown rice also maintains gamma aminobutyric acid, which is a unique constituent of germinated brown rice enriched in the endosperm.

The germinated brown rice proposed by the present invention contains gelatinized starch by 9 to 40% of the total starch content of dry germinated brown rice when measured by the BAP method. Specifically, partial gelatinization of starch constituting the germinated brown rice (conversion of starch to alpha starch) adjusts the water absorption condition of the rice when the rice is cooked, to achieve virtually equivalent properties to white rice after cooking. By adjusting the conversion of starch in germinated brown rice to alpha starch, the water absorption ratio of germinated brown rice in the water soak process can be adjusted to a level appropriate for cooking, which in turn improves the cooking property and taste of rice further.

The germinated brown rice proposed by the present invention also offers improved shelf life and handling ease if dried.

The germinated brown rice proposed by the present invention has a water absorption ratio of 35 to 60 percent by weight when dry germinated brown rice is soaked for 24 hours in 30° C. water. This prevents rapid or excessive water absorption during cooking, and therefore permits the germinated brown rice to be mixed with polished white rice and cooked together. None of the germinated brown rice brands available on the market today has this feature of controlled water absorption ratio.

In addition, the germinated brown rice proposed by the present invention also prevents cracking of rice grain, which causes excess water absorption and chipped rice and consequently reduces the taste of rice. In this sense, this present germinated brown rice offers an excellent appearance and appeals more favorably to consumers.

The germinated brown rice proposed by the present invention adds favorable sweetness not available in traditional germinated brown rice, gives unique texture (especially stickiness), and provides excellent taste not offered by traditional germinated brown rice.

BEST MODE FOR CARRYING OUT THE INVENTION

Figure 1:
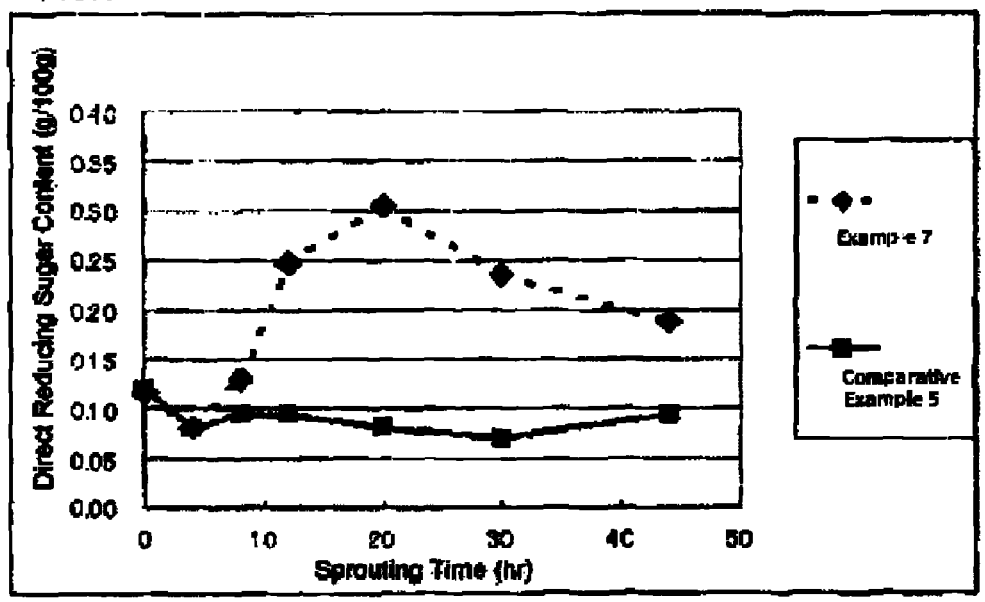
FIG. 1 Graph showing how the content of direct reducing sugar changes over time
FIG. 2 Graph showing the change in water absorption ratio as a function of soak time (0 to 5 hours)
FIG. 3 Graph showing the change in water absorption ratio as a function of soak time
FIG. 4 Figure showing the condition of soak for 24 hours
FIG. 5 Figure showing the condition of germinated brown rice grains used in Example 1
FIG. 6 Figure showing the condition of germinated brown rice grains used in Comparative Example 1

The present invention is explained in details.
The invention of the present application provides germinated brown rice containing higher levels of direct reducing sugar and sucrose in the rice, or residual contents thereof, compared to the material brown rice.

Naturally, brown rice contains only a small amount of direct reducing sugar. As for water-soluble sucrose, the conventional production methods cause germinated brown rice to release and lose sucrose or otherwise suffer significant loss of sucrose content in the soak and shower steps. Sucrose is mostly contained in the germ of brown rice, and therefore polished white rice contains little sucrose. The inventors focused on, and controlled, sucrose and direct reducing sugar in germinated brown rice in which starch has gelatinized in the germinating process, and also adjusted the starch gelatinization degree and thus enhanced cooking property of rice, to ultimately provide germinated brown rice offering improved taste at the time of actual consumption. The germinated brown rice proposed by the present invention also offers improved utility through control of other factors affecting the cooking property of rice.

The present invention provides germinated brown rice containing a higher level of direct reducing sugar than in the material brown rice, and a high level of sucrose whose loss through dissolution in water is suppressed, wherein the germinated brown rice contains 0.15 g or more of direct reducing sugar and/or 0.5 g or more of sucrose per 100 g of the dry weight of germinated brown rice.

The germinated brown rice pertaining to the present invention also contains 0.15 g or more of direct reducing sugar per 100 g of the dry weight of germinated brown rice, wherein gelatinized alpha starch in the germinated brown rice accounts for 9 to 40% of the total starch content when measured by the BAP method.

The germinated brown rice pertaining to the invention of the present application should contain preferably 0.15 to 0.35 g of direct reducing sugar and 0.5 to 1.2 g of sucrose, or more preferably 0.2 to 0.35 g of direct reducing sugar and 0.6 to 1.2 g of sucrose, per 100 g of germinated brown rice. With traditional polished rice grains, the contents of sucrose and direct reducing sugar are determined at harvest and cannot be changed.

The present invention changes the contents of these constituents after harvest, and also increases and fixes these constituents that are not given any special treatment and consequently released during the production of traditional germinated brown rice. When the contents of direct reducing sugar and sucrose in germinated brown rice are within the ranges specified in the present invention, favorable sweetness not available in traditional germinated brown rice is produced, while a unique texture (especially stickiness) is also added, thereby resulting in excellent taste not offered by traditional germinated brown rice.

The contents of direct reducing sugar and sucrose in the germinated brown rice proposed by the invention of the present application and in traditional germinated brown rice and brown rice, were measured through analysis, and the results are provided herein.

The present invention provides germinated brown rice of improved taste, by adjusting the content of direct reducing sugar to a range of 0.15 to 0.35 g per 100 g of germinated brown rice, by adjusting the content of gelatinized starch in dry germinated brown rice to a range of 9 to 40% of the total starch content as measured by the BAP method, and also by adjusting the content of sucrose to a range of 0.5 to 1.2 g per 100 g of germinated brown rice. As explained above, various methods have been examined in the past to make cooked germinated brown rice tastier. In the germinating process, enzymes in germinated brown rice are activated to cause starch, protein, hemicellulose and other high-molecular constituents that maintain the structure of brown rice (matrix maintaining constituents) to change to low molecules, and this change gives to germinated brown rice a structure different from that of white rice. This structural difference is the reason why germinated brown rice does not absorb water uniformly in the cooking process, thereby allowing the rice to absorb an excessive or insufficient amount of water and therefore producing poorly cooked rice. Or, when germinated brown rice is mixed with white rice, germinated brown rice is cooked differently than white rice, which produces foreign-body sensation in the mouth and ultimately leads to a perception of "poor taste." However, the inventors of the present application earlier developed and patented a technology to cook germinated brown rice to virtually the same hardness as white rice, by partially gelatinizing starch that constitutes germinated brown rice (i.e., converting it to alpha starch), and then drying the rice, in order to adjust the water absorption condition during cooking (refer to Patent Literature 5). Under the invention of the present application, the inventors examined the aforementioned technology in details and added further improvements, and as a result discovered that a good cooking condition would be achieved when the content of gelatinized starch in germinated brown rice was between 9 and 40%, or preferably between 9 and 30%, or more preferably between 15 and 30%, as measured by the BAP method. The gelatinization degree of starch is closely related to the tastiness or untastiness of rice. If the gelatinization degree exceeds 40%, the rice loses body and stickiness when cooked. If more water is added to improve the texture, the rice becomes too soft and gummy, and does not produce a favorable result when cooked.

By adjusting the alpha conversion of starch in germinated brown rice as explained above, it becomes possible to adjust the ratio of water absorption by germinated brown rice during soak to a level appropriate for cooking, and consequently improve the taste of cooked rice. When the dry germinated brown rice conforming to the invention of the present application was soaked for 24 hours in 30° C. water, the water absorption ratio was 35 to 60 percent by weight. In contrast, it was virtually impossible to control the water absorption ratio of germinated rice produced by the conventional method.

Furthermore, the present invention suppresses notable cracks in rice gain compared to conventional products. Cracking of rice is caused by sudden change in the water content of brown rice, and these cracks not only make adjustment of water absorption ratio impossible before cooking, but they also cause chipped rice that eventually leads to poor taste. The invention of the present application prevents cracking of rice by controlling the amount of water added, and thereby permits control of water absorption ratio before cooking. As a result, there is no longer broken rice or resulting poor taste of cooked rice. Also, the present invention makes it possible to markedly reduce such cracks by means of refinement and alpha starch conversion in the germinating process. Specifically, the invention of the present application provides germinated brown rice that keeps the ratio of cracked rice to 50% or below, when observed by a magnifying glass using an optical observation system such as a grain scope manufactured by Kett Electric Laboratory, etc. Such germinated brown rice gives an excellent appearance and appeals more favorably to consumers.

The material brown rice used in the invention of the present application can be brown rice of any species, as long as it is suitable for cooking and is able to germinate. When considering the best cooking result, however, brown rice of the Japonica species is preferred. The present invention is also suitable for processing glutinous rice, in that the rice becomes sweater and stickier and therefore tastier.

The germinated brown rice proposed by the present invention can be obtained mainly by the production method explained below.

The inventors realized germinated brown rice containing high levels of sucrose and direct reducing sugar not heretofore available in germinated brown rice, by slowly adding water in a controlled manner in the germinating process of brown rice. This is a completely new insight.

A higher content of direct reducing sugar is also an indicator that the molecules of high-molecular starch as well as hemicellulose and lignins constituting the bran layer have been broken down, because an increased level of direct reducing sugar means that various enzymes have acted upon these high molecules in the germinating process and caused them to change to low molecules. Because of this change of high molecules constituting the bran layer to low molecules, the hardness of rice and sensation felt in the mouth—which are traditionally considered drawbacks of brown rice—have been improved, and germinated brown rice offering virtually same taste as white rice after cooking has been achieved. The inventors found that, to achieve this new germinated brown rice, it was better to supply to the brown rice before germinating, at a controlled speed, the minimum amount of water required for germinating, instead of soaking brown rice in an excessive amount of water.

Specifically, one method to obtain the germinated brown rice proposed by the present invention comprises the following operation. Prepare dry grains whose water content has been adjusted to a range of 10 to 15% beforehand. Slowly add water to these grains at a speed of 0.5 to 2.0% per hour until the water content falls in a range of 20 to 30%. Then, transfer the grains into a tank and refine (temper) them for 2 to 10 hours under ventilation. Since the speed of adding water to the grains is restricted, the grains absorb water slowly and thus alteration of grain properties, such as cracking, can be suppressed. Also, direct reducing sugar and sucrose produced in the germinating process do not elute into the water in which the grains are soaked, but they are instead retained in the germinated rice grains at high contents. As an added benefit, gamma aminobutyric acid, which is produced by germinating of rice, can be enriched in the endosperm of the rice. In the invention of the present application, "refinement (tempering)" refers to an operation in which brown rice grains that have absorbed water are agitated slowly in a sealed container while being maintained in a uniform state, as explained above. In other words, germinating operation is no longer performed in the presence of excessive water, in water, or under running water, as proposed by conventional technologies. By supplying only the minimum amount of water needed for germinating, the aforementioned loss of direct reducing sugar, sucrose, vitamins and minerals, which occurs in the conventional germinating process due to dissolution in water, can be prevented. Furthermore, thus produced direct reducing sugar, sucrose or enriched gamma aminobutyric acid in the endosperm are not lost during polishing or other subsequent processes.

Therefore, the germinated brown rice proposed by the present invention keeps direct reducing sugar, sucrose and gamma aminobutyric acid at high concentrations even after the brown rice has been processed into rice with germ, polished white rice, or rice powder.

Since an aerobic environment is maintained, growth of bacteria that cause foul smell is suppressed, meaning that the rice remains odor free.

In addition, water is added slowly in small quantities in the aforementioned process of adding water to dry germinated brown rice grains, by means of spraying water as mist onto the surface of germinated brown rice grain and causing water droplets to attach to the surface. Since this causes water to be absorbed uniformly into the cell tissue of the rice grain, alteration of grain properties such as cracking can be suppressed.

Then, when refining the aforementioned hydrated rice grains, outside air is introduced into the tank to maintain ventilation.

Other methods can also be selected as deemed appropriate, such as maintaining harvested unhulled rice in a condition where the rice retains a high water content, promoting germinating in this condition, and then drying the germinated rice. When adding water, a method to apply low-temperature steam to keep the rice temperature to a range of 40 to 50° C. can be selected. Whatever method is used, germinated brown rice having the desired properties and effects intended by the invention of the present application can be achieved as long as strict water content control (control of water content in the form of slow addition of water and tempering as explained herein) is given when supplying, in the germinating process of brown rice, the amount of water needed for germinating.

The germinating process can be stopped by means of low-temperature processing, drying, heating or microwave irradiation, among others.

The degree of alpha conversion of starch can be adjusted to a desired level by, for example, adjusting the heating condition in humid ambience during the production of germinated brown rice. For instance, germinated brown rice is steamed for 1 to 30 minutes at 98° C. Then, steamed germinated brown rice is dried by means of air blow using air of normal temperature, while adjusting the rate of decrease in water content, until the water content of germinated brown rice becomes 10 to 20%. For example, this drying can be performed in a condition where the rate of decrease in water content is kept to below 0.8% per hour.

By handling the germinating process, alpha starch conversion process and drying process in this manner, the ratio of cracked rice can be kept to 50% or below, and germinated brown rice whose water absorption ratio is adjusted to a range of 35 to 60 percent by weight when the rice is soaked for 24 hours at 30° C. water can be produced.

If alpha starch conversion is not performed, germinated brown rice can be dried after the germinating process by means of air blow using air of normal temperature, while adjusting the rate of decrease in water content, until the water content of germinated brown rice becomes 10 to 20%, to obtain dry germinated brown rice.

The invention of the present application is explained in details using examples and test examples.

It should be noted, however, that the present invention is not at all limited to these examples. Each example incorporates an alpha starch conversion process, but it is also possible to provide dry-type or wet-type germinated brown rice that does not undergo the specified alpha starch conversion process after the germinating process.

Example 1 ater was added slowly to 50 kg of brown rice produced in Hokkaido Prefecture (Hoshinoyume), whose water content had been pre-adjusted to around 14%, until the water content increased to a range of 20 to 30%. To prevent cracking of rice grain, water was initially added at a speed of 0.5% per hour until the water content reached 17%, and once the water content exceeded 17%, the speed of adding water was increased gradually to a range of 0.5 and 0.9% per hour. Specifically, brown rice was agitated in a horizontal drum of 100 cm in diameter and 200 cm in length, turning at a speed of 4 rpm, and the two-fluid spray nozzle installed in the drum was used to supply water at a speed of 10 g per minute in a manner not allowing water to drip from the rice. Water had the temperature of tap water, and its pH was not adjusted. Water was sprayed from the nozzle as mist and caused to attach to the surface of brown rice as water droplets, so that water would not drip from the brown rice. Causing the brown rice to contact water droplets while agitated ensured uniform addition of water. Tap water with an effective chlorine concentration of less than 50 ppm was used. Upon completion of the water addition process, rice was transferred into a tank, etc., and refined (tempered) for 2 to 10 hours. The environmental temperature during tempering was optimally adjusted to a range of 16 to 24° C., and outside air was introduced into the tank to maintain ventilation. The series of steps were conducted at room temperature of around 20° C., until the germinating process was completed. Then, brown rice was steamed to convert starch to alpha starch. This steaming process was carried out using a continuous rice steamer, in which rice was steamed for a specified time of 5 to 30 minutes in steam of 2 kg/h and 100° C. Thereafter, steamed brown rice was dried by means of air blow using air of normal temperature in a condition where the rate of decrease in water content was kept to less than 0.8% per hour, to obtain 50 kg of germinated brown rice with a water content of 15%. It is also possible to obtain the same amount of dry germinated brown rice with a water content of approx. 15%, by drying the rice after germinating, without implementing alpha starch conversion.

Example 2

Water was added slowly to 50 kg of brown rice (Hoshinoyume), whose water content had been pre-adjusted to around 14%, until the water content increased to a range of 20 to 30% (water to be added may be tap water, water whose pH or temperature has been adjusted as appropriate, or aqueous solution used in food products or containing bioactivation substances). A brown rice agitator was used in the water addition process. This apparatus had a cylindrical shape of 30 cm in inner diameter and 2 m in length, with agitating blades of 25 cm in inner diameter and 2 m in length attached inside the aforementioned cylinder placed horizontally. Both ends of the brown rice agitator were open, and brown rice and water were supplied from one side. Brown rice was added at a speed of 5 kg per minute, while water was dripped at a speed of 25 g per minute, and the apparatus was turned at a speed of 100 rpm to agitate the rice and water. This agitation ensured that water was added uniformly to rice grains. After one pass through the agitator, the water content of brown rice increased 0.5%, with hydrated rice discharged from the other side. Discharged brown rice was transferred into a refinement tank, kept there in a stationary state until the next water addition process for a duration adjusted to achieve water addition at a speed of 0.5% per hour, and then returned to the water addition/agitation process using the cylindrical agitator. This way, the water content of brown rice was increased to 17%. Once the water content reached 17%, water was added by adjusting the time so that the rate of increase in the water content of brown rice was kept to 1.0% or below per hour, until the final water content of 23% or above was reached. Next, brown rice was tempered, and then steamed in a continuous rice steamer for a specified time of 5 to 30 minutes in steam of 2 kg/h and 100° C. Thereafter, steamed brown rice was dried by means of air blow using air of normal temperature in a condition where the rate of decrease in water content was kept to less than 0.8% per hour, to obtain 50 kg of germinated brown rice with a water content of 15%.

Example 3

In Example 3, the same method as described in Example 2 was used to obtain 50 kg of germinated brown rice with a water content of 15% from the Hinohikari brand of brown rice produced in Kagawa Prefecture.

Example 4

In Example 4, the same method as described in Example 2 was used to obtain 50 kg of germinated brown rice with a water content of 15% from the Koshihikari brand of brown rice produced in Niigata Prefecture.

Example 5

In Example 5, the same method as described in Example 2 was used to obtain 50 kg of germinated brown rice with a water content of 15% from the Kirara brand of brown rice produced in Hokkaido Prefecture.

Example 6

In Example 6, the same method as described in Example 2 was used to obtain 50 kg of germinated brown rice with a water content of 15% from the Milky Queen brand of brown rice produced in Hokkaido Prefecture.

Example 7

Water was added to the rice under the conditions described in Example 1, after which the rice was tempered continuously. Under Test Example 1, sample was taken periodically during the water adding and tempering processes, to check the concentration of direct reducing sugar.

Comparative Example 1

A rice washer was used to wash 50 kg of material brown rice (Hoshinoyume produced in Hokkaido Prefecture), and washed rice was soaked for 5 hours in a thermostatic chamber adjusted to 25° C. until water absorption saturated. Then, rice was drained, dewatered and left for 20 hours in a sealed dark room of gaseous phase to cause germinating. Thereafter, germinated rice was steamed for 2 minutes at 98° C. in a continuous steamer, and then dried for 20 minutes in a fluidized bed of 80° C. to obtain dry germinated brown rice with a water content of 15%.

Comparative Example 2

A rice washer was used to wash 50 kg of material brown rice (Hinohikari produced in Ehime Prefecture), and washed rice was soaked for 5 hours in a thermostatic chamber adjusted to 25° C. until water absorption saturated. Then, rice was drained, dewatered and left for 20 hours in a sealed dark room of gaseous phase to cause germinating. Thereafter, germinated rice was steamed for 2 minutes at 98° C. in a continuous steamer, and then dried for 20 minutes in a fluidized bed of 80° C. to obtain dry germinated brown rice with a water content of 15%.

Comparative Examples 3 and 4

In accordance with the method to germinate rice in an ambience of 100% humidity as described in Japanese Patent Laid-open No. 2002-291423, 50 kg of material brown rice (Hoshinoyume produced in Hokkaido Prefecture) was washed using a rice washer, and washed rice was germinated in an environment of 100% humidity. Next, germinated rice was sterilized by boiling and then dried (Comparative Example 3), or sterilized by steaming and then dried (Comparative Example 4), to obtain dry germinated brown rice with a water content of 15%.

Comparative Example 5

Under the conditions described in Comparative Example 1, material brown rice was soaked in a thermostatic chamber adjusted to 30° C., and then let soak continuously for 45 hours. In Test Example 1, soaked brown rice was sampled periodically to check the concentration of direct reducing sugar.

Test Examples

The tests described below were conducted on the germinated brown rice samples obtained in the aforementioned examples and comparative examples, as well as on commercial germinated brown rice brands listed in Tables 1 and 4, to examine by comparison the effects of the germinated brown rice proposed by the present invention.

TABLE 1

| | Example of commercial germinated brown rice |
|---|---|
| 1 | Kome no Shimamura Hatsuga Genmai |
| 2 | Kanna Hatsuga Chokuzen Genmai |
| 3 | Daimatsu Hyo-on Hatsuga Genmai |
| 4 | Kitoku Shinryo Hatsuga Genmai |
| 5 | Hakubaku Hatsuga Genmai |
| 6 | CI Foods Hatsuga Genmai |
| 7 | Kojima Hatsuga Genmai |
| 8 | Osawa Kassei Hatsuga Genmai |
| 9 | Mega Dete Genki |
| 10 | Yamato Rice Hatsuga Genmai |
| 11 | Soshoku Seikatsu Hatsuga Genmai |
| 12 | Senshukai Niigata Umai |
| 13 | Kameda Milky Queen no Hatsuga Genmai |
| 14 | Medeta Genmai |
| 15 | Murase Hatsuga Genmai |
| 16 | DHC Hatsuga Genmai |
| 17 | Sera Hatsuga Genmai |
| 18 | Medical Foods Hatsuga Genmai |
| 19 | Kikkoman Neo Genmai |
| 20 | Yamatane Hatsuga Genmai |
| 21 | Azuma Milky Queen no Hatsuga Genmai |
| 22 | Kenko Dojo Hatsuga Genmai |
| 23 | Kureha Fuga |
| 24 | Domer Hatsuga Genmai (Dry Type) |
| 25 | Fukuren Hatsuga Genmai |
| 26 | Akitakomachi Minus Ion Hatsuga Genmai |
| 27 | Toyota Co-op Hatsuga Genmai |
| 28 | Anan Co-op |
| 29 | Hyuga Nouran Hatsuga Genmai |
| 30 | Kenko Genmai |
| 31 | Fujihatsuga Hatsuga Genmai |
| 32 | Hatsuga Genmai Wet Type |

TABLE 4

| | Example of commercial germinated brown rice |
|---|---|
| 33 | Kameda Seika Fukkura Takitate Hatsuga Genmai |
| 34 | Kameda Seika Yawaraka Milky Queen no Hatsuga Genmai |
| 35 | Katei Gaho no Hatsuga Genmai |
| 36 | Domer New Hatsuga Bijin |
| 37 | Domer Sawapikari Hatsuga Genmai |
| 38 | Domer Haiminori Hatsuga Genmai |
| 39 | Osawa Hatsuga Genmai |
| 40 | Shizen no Yakata Ganbaru Kazoku no Hatsuga Genmai |

Test Example 1

Analysis of Direct Reducing Sugar Content

The test solution was prepared as follows. First, specimen was extracted under ultrasonic waves for 1 hour in a weak alkali solution, and then neutralized, after which lead acetate was added to remove protein. Next, extract was adjusted to a constant volume and filtered, after which sodium carbonate was added to remove lead. The resulting solution was filtered again to obtain a test solution.

Direct reducing sugar was analyzed in accordance with "Kangento no Teiryoho (Assay Methods for Reducing Sugar)" by Sakuzo Fukui (Japan Scientific Societies Press). Measurement was taken by the Somogyi method, and the content of direct reducing sugar was obtained as equivalent dextrose content. The analysis results are shown in Tables 2 and 5.

<Sucrcrose Analysis Method>

Surose was analyzed by means of high-speed liquid chromatography.

The test solution was prepared as follows. First, specimen was suspended and neutralized using a 50% v/v ethanol solution, and then extracted under ultrasonic waves. Next, extract was adjusted to a constant volume, and filtered through filtration paper, and then filtrate was condensed, dried and solidified. Thereafter, dry solids were dissolved in water again, and filtered at 0.45 um to obtain a test solution as filtrate.

High-speed liquid chromatography was carried out using LC-10 Advp (manufactured by Shimadzu Corporation) as the analyzer, Differential Refractometer RID-10A (manufactured by Shimadzu Corporation) as the detector, and Wakosil 5NH2 Ø4.6 mm×250 mm (manufactured by Wako Pure Chemical Industries) as the column.

The analysis results are shown in Tables 2 and 5.

TABLE 2

| Specimen | Direct reducing sugar content (Test Example 1) g/100 g | Sucrose content (Test Example 1) g/100 g | Gelatinization degree by BAP method (Test Example 2) % | Water absorption ratio (Test Example 3) % | Ratio of cracked rice (Test Example 4) % |
|---|---|---|---|---|---|
| Example 1 | 0.31 | 0.85 | 22.3 | 42.0 | 50.0 |
| Example 2 | 0.19 | 0.74 | 15.2 | 42.0 | 30.0 |
| Example 3 | 0.15 | 0.58 | 33.8 | 58.0 | 35.0 |
| Example 4 | 0.22 | 0.76 | 9.1 | 36.0 | 10.0 |
| Example 5 | 0.31 | 0.73 | 14.1 | 38.0 | 33.0 |
| Example 6 | 0.20 | 0.81 | 16.7 | 40.0 | 20.0 |
| Comparative Example 1 | 0.08 | 0.35 | 39.2 | 107.0 | 90.0 |
| Comparative Example 2 | 0.10 | 0.38 | 42.3 | 101.0 | 90.0 |
| Comparative Example 3 | 0.07 | 0.69 | 88.0 | 112.0 | 75.0 |
| Comparative Example 4 | 0.08 | 0.73 | 89.0 | 96.0 | 68.0 |
| Commercial Product A | 0.11 | 0.38 | 13.5 | 34.0 | 90.0 |

TABLE 2-continued

| Specimen | Direct reducing sugar content (Test Example 1) g/100 g | Sucrose content (Test Example 1) g/100 g | Gelatinization degree by BAP method (Test Example 2) % | Water absorption ratio (Test Example 3) % | Ratio of cracked rice (Test Example 4) % |
|---|---|---|---|---|---|
| Commercial Product B | 0.15 | 0.35 | 93.6 | 139.0 | 80.0 |
| Commercial Product C | 0.11 | 0.37 | 11.9 | 30.0 | 90.0 |
| Commercial Product D | 0.11 | 0.34 | 12.1 | 28.0 | 95.0 |
| Commercial Product E | 0.18 | 0.36 | 7.4 | 32.0 | 98.0 |
| Commercial Product F | 0.12 | 0.36 | 60.2 | 124.0 | 94.0 |
| Commercial Product G | 0.10 | 0.35 | 10.1 | 27.0 | 88.0 |
| Commercial Product H | 0.08 | 0.86 | 17.3 | 30.0 | 92.0 |
| Commercial Product I | 0.12 | 0.32 | 9.4 | 24.0 | 15.0 |
| Commercial Product J | 0.10 | 0.21 | 12.2 | 21.0 | 10.0 |
| Commercial Product K | 0.05 | 0.21 | 12.1 | 31.0 | 80.0 |
| Commercial Product L | 0.10 | 0.22 | 72.5 | 101.0 | 80.0 |
| Commercial Product M | 0.05 | 0.21 | 84.0 | 180.0 | 80.0 |
| Commercial Product N | 0.10 | 0.22 | 64.0 | 75.0 | 88.0 |
| Commercial Product O | 0.11 | 0.30 | 14.2 | 28.0 | 80.0 |
| Commercial Product P | 0.11 | 0.33 | 68.4 | 188.0 | 98.0 |
| Commercial Product Q | 0.12 | 0.35 | 52.5 | 80.0 | 99.0 |
| Commercial Product R | 0.11 | 0.38 | 7.2 | 23.0 | 80.0 |
| Commercial Product S | 0.12 | 0.38 | 75.3 | 88.0 | 94.0 |
| Commercial Product T | 0.10 | 0.32 | 60.0 | 75.0 | 93.0 |
| Commercial Product U | 0.10 | 0.31 | 77.6 | 89.0 | 90.0 |
| Commercial Product V | 0.09 | 0.33 | 50.1 | 88.0 | 88.0 |
| Commercial Product W | 0.09 | 0.34 | 42.4 | 65.0 | 80.0 |
| Commercial Product X | 0.05 | 0.33 | 45.4 | 80.0 | 72.0 |
| Commercial Product Y | 0.11 | 0.33 | 57.9 | 98.0 | 85.0 |
| Commercial Product Z | 0.12 | 0.32 | 51.5 | 100.0 | — |
| Commercial Product a | 0.11 | 0.36 | 7.4 | 27.0 | 70.0 |
| Commercial Product b | 0.13 | 0.37 | 52.6 | 85.0 | 80.0 |
| Commercial Product c | 0.11 | 0.38 | 43.7 | 80.0 | 78.0 |
| Commercial Product d | 0.08 | 0.33 | 80.8 | 131.0 | 90.0 |
| Commercial Product e | 0.07 | 0.32 | 84.2 | 126.0 | 92.0 |
| Commercial Product f | 0.07 | 0.28 | 95.6 | — | — |
| Hoshinoyume brown rice | 0.12 | 0.96 | 9.7 | 27.0 | 5.0 |
| Koshihikari brown rice | 0.07 | 1.10 | — | — | — |
| Akitakomachi brown rice | 0.04 | 1.08 | — | — | — |

TABLE 5

| Specimen | Direct reducing sugar content (Test Example 1) g/100 g | Sucrose content (Test Example 1) g/100 g | Gelatinization degree by BAP method (Test Example 2) % |
|---|---|---|---|
| Commercial Product g | 0.11 | 0.22 | 79.0 |
| Commercial Product h | 0.10 | 0.40 | 55.7 |
| Commercial Product i | 0.08 | 0.29 | 9.5 |
| Commercial Product j | 0.00 | 0.07 | 42.3 |
| Commercial Product k | 0.09 | 0.12 | 68.5 |
| Commercial Product m | 0.10 | 0.17 | 41.6 |
| Commercial Product n | 0.13 | 0.23 | 37.3 |
| Commercial Product o | 0.08 | 0.27 | 6.4 |

As shown in Tables 2 and 5, the germinated brown rice samples conforming to the present invention generally exhibited higher contents of direct reducing sugar and sucrose compared to the germinated brown rice samples produced by the conventional method. The reference samples of brown rice and polished white rice all had higher sucrose contents than germinated brown rice, but their direct reducing sugar contents were lower. The measured levels of direct reducing sugar content and sucrose content accurately reflect the taste test results in Test Example 5.

The germinated rice samples obtained by Comparative Examples 3 and 4 had higher contents of sucrose but lower contents of direct reducing sugar, and were found hard on the bran layer in the taste test explained below. Low direct reducing sugar content and high sucrose content are common properties of brown rice, and therefore the germinated brown rice samples obtained by Comparative Examples 3 and 4 are considered very close to brown rice.

The brown rice samples obtained by Example 7 and Comparative Example 5 were sampled periodically to measure the change in direct reducing sugar content over time. The results are shown in FIG. 1. The water addition method employed in Comparative Example 5 did not result in increased direct reducing sugar. On the other hand, the sample obtained by Example 7, where the speed of adding water was adjusted, exhibited a marked increase in direct reducing sugar. While the concentration of direct reducing sugar in the material brown rice (Hoshinoyume) was 0.12 g per 100 g, the content of direct reducing sugar in the sample obtained by Example 7 was as high as 0.31 g per 100 g. Under Example 7, the direct reducing sugar content hit the peak after 20 hours of germinating, and then decreased thereafter. This is likely because direct reducing sugar was consumed as energy for germinating. This suggests that, by adjusting the water addition process so that water is added at a slow speed, production of direct reducing sugar is promoted while consumption of direct reducing sugar as energy for germinating can be suppressed. The adjustment also makes it possible to set an optimal germinating time resulting in the highest concentrations of nutrients.

Test Example 2

Measurement of Starch Gelatinization Degree by BAP Method

Measurement of gelatinization degree by the BAP method (beta amylase pullulanase method) was carried out by referencing the method cited by Keiji Kainuma et al. (Denpun Kagaku (Starch Science), Vol. 28, No. 4, pp. 235 to 240, 1981).

Samples were prepared in accordance with the method in the aforementioned literature. To be specific, three processing solutions, namely, acetic acid processing solution (Solution S), NaOH processing solution (Solution R) and blank processing solution produced in the same manner as Solution R, except that the enzyme solution was deactivated (Solution R0), were prepared.

Next, Solutions S, R and R0 were colored by the ferricyanide method. Specifically, 5 ml of ferricyanide test solution was added to 1 ml of specimen solution, and the mixture was heated for 10 minutes in a boiling water bath, after which the mixture was cooled and then absorbance was measured at 420 nm. The aforementioned ferricyanide solution was prepared by dissolving 0.37 g of potassium ferricyanide and 20.0 g of carbonic anhydride in 1 L of distilled water. Absorbance levels of Solutions S, R and R0 were expressed as S, R and R0, respectively, and applied to the calculation formula below to obtain gelatinization degrees:

$$\text{Gelatinization degree (\%)} = (R0-S)/(R0-R) \times 100$$

The analysis results are shown in Tables 2 and 5.

The gelatinization degrees of germinated brown rice samples produced in accordance with the present invention were within a range of 9 to 40%.

Test Example 3

Water Absorption Ratio, Change in Water Absorption Ratio Over Time, and Water Absorption Condition (1) To measure water absorption ratio, 10.00 g of rice grains were soaked for 24 hours in 30° C. water, and then the weight change of rice grains was obtained as a percentage change by weight relative to the weight before the soak. Before weighing, excess water attached to the surface of brown rice was removed. The measured results are shown in Table 2 below. While the water absorption ratios of germinated rice samples conforming to the present invention fell in a range of 36 to 58%, the water absorption ratios of commercial products and germinated brown rice samples produced per the conventional technology were largely 60% or above. Although there were also many products with a water absorption ratio of 35% or below, they tasted like normal brown rice and were hard and not savory.

(2) Measurement Method of Change in Water Absorption Ratio Over Time

To check water absorption ratio of commercial products, change in water absorption ratio was observed on the samples obtained by Examples 1 and 2 and Comparative Example 1. Specifically, 10.00 g of rice grains were soaked in 30° C. water, and the weight changes of rice grains after 0.5, 1, 2, 3, 4 and 5 hours were measured in percentage. Before weighing, excess water attached to the surface of brown rice was removed.

Figure 2:
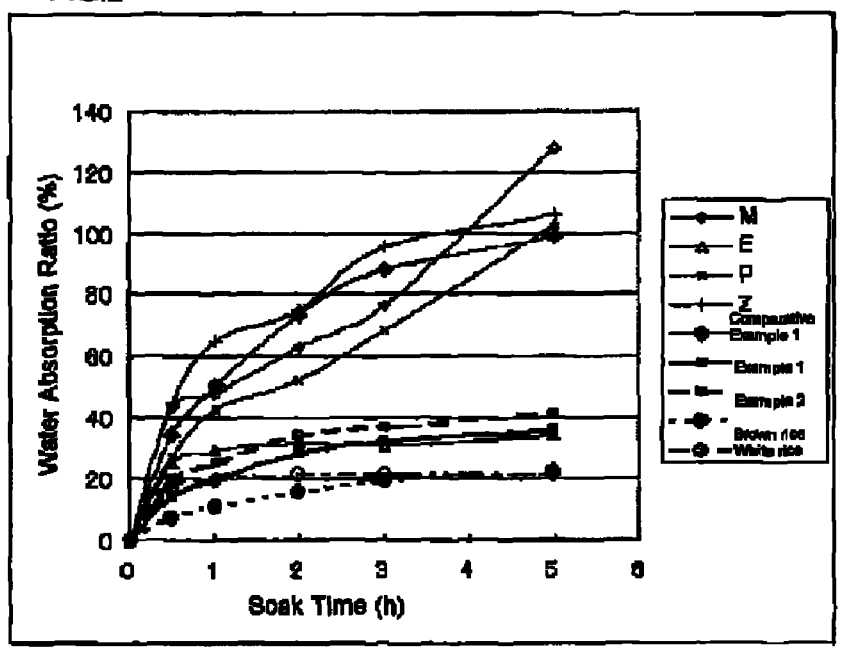
Figure 3:
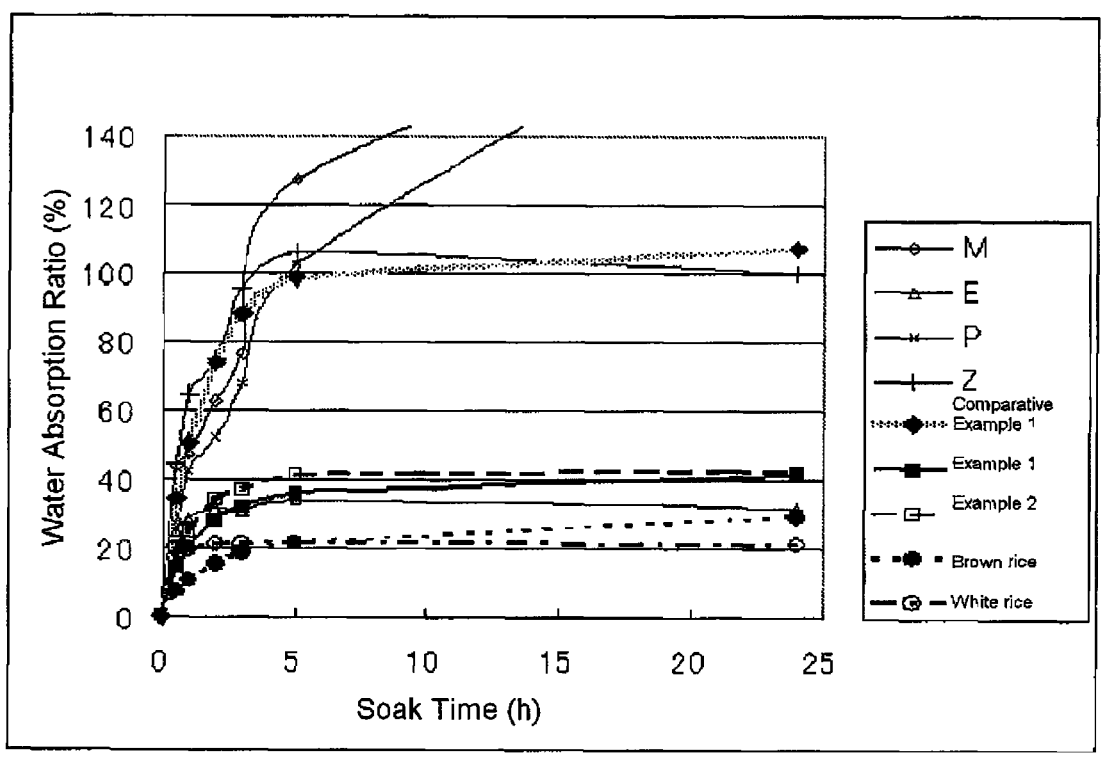

Although the germinated brown rice samples conforming to the invention of the present application exhibited slow water absorption immediately after the start of water absorption, just like white rice, the commercial products and samples obtained by comparative examples rapidly absorbed water immediately after the start of water absorption. This explains why the rice grains of germinated brown rice samples conforming to the present invention had less cracks or structural disintegration. As the saturated water absorption ratio is affected significantly by the gelatinization degree, the gelatinization degrees of samples conforming to the present invention were adjusted to a range of 9 to 40%, or preferably 9 to 30%, or more preferably 15 to 30%, and thus these samples demonstrated appropriate saturated water absorption ratios greater than those of white rice and regular brown rice. For this reason, these samples produced best hardness and elasticity when cooked, just like white rice, which likely improved their taste significantly. FIG. 2 gives a graph showing the rate of change in water absorption for a 5-hour period after start of water absorption, while FIG. 3 gives a graph showing the rate of change in water absorption for a 24-hour period after start of water absorption. Commercial Products M, P and Z had fast water absorption speeds like the sample obtained by Comparative Example 1, and their saturated water absorption ratios were also high. Commercial Product E had a saturated water absorption ratio close to those exhibited by the samples conforming to the present invention, but its initial water absorption was quick and this led to more cracks and structural disintegration in rice grains.

(3) Observation Method of Water Absorption Condition

Figure 4:
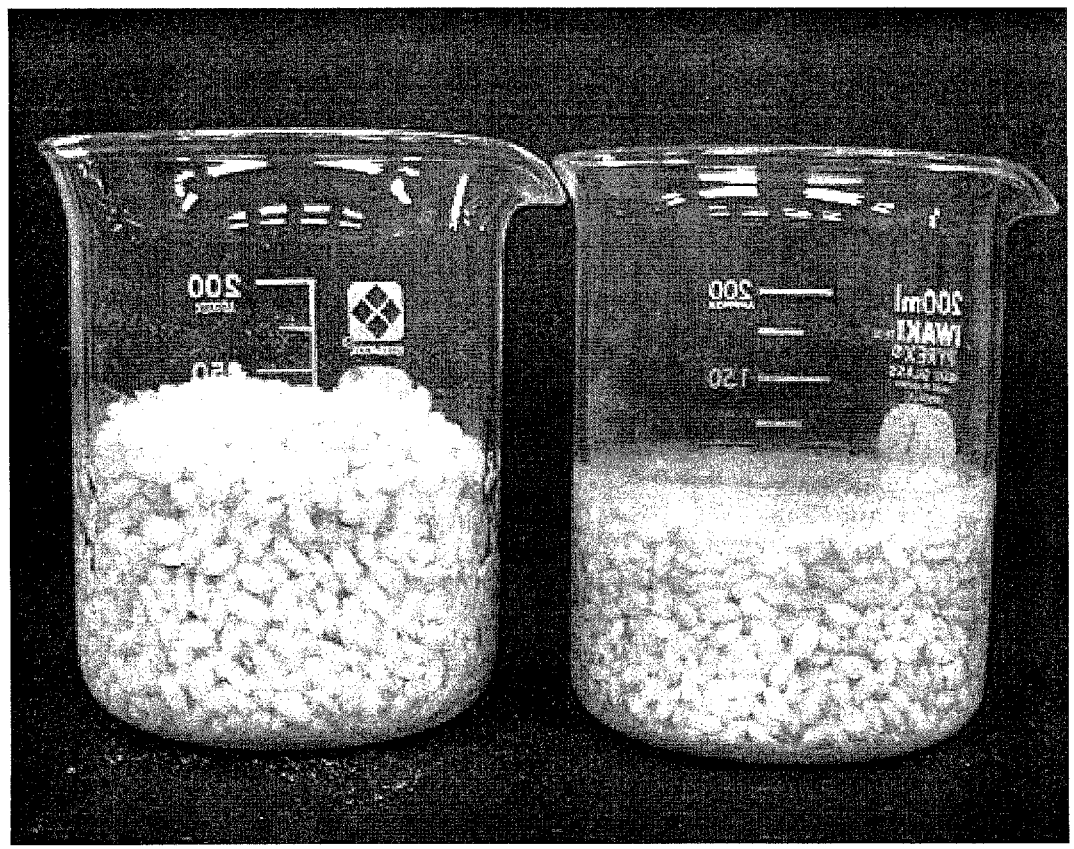

To observe water absorption condition, 200 g of rice grains were soaked in 380 g of water (corresponding to the amount of water required for cooking the aforementioned amount of rice) whose temperature had been adjusted to 30° C., after which rice was left for 24 hours in room temperature, and then the properties of rice grain and amount of excess water were checked. As representative examples, the observation results of germinated brown rice obtained by Example 1 and another germinated brown rice obtained by Comparative Example 1 are shown in FIG. 4. Commercial products of higher gelatinization degrees showed water absorption conditions similar to those of samples obtained by comparative examples, and there was little remaining water. Although with these samples cooked rice tends to become softer if soaked longer before cooking, the sample obtained by Example 1 did not become undesirably soft.

Test Example 4

Ratio of Cracked Rice and Observation Test

Observation Evaluation Method
Measurement Method of Crack Ratio and Crush Ratio

The crack ratio and crush ratio of 50 rice grains were calculated via visual counting using a grain scope manufactured by Kett Electric Laboratory. The final crack ratio was obtained as an average of eight measurements taken. The judgment criteria for crack are as follows.

Minor cracking: One or more cracks in a rice grain, where no crack extends fully across the width of the rice grain and the rice grain does not chip during polishing.

Major cracking: One or more cracks in a rice grain, where one or more cracks extend fully across the width of the rice grain and the rice grain chips during polishing.

Chipped rice: At least one-fifth of the rice grain is missing.

Of all rice grains, those exhibiting major cracking or chipped rice condition, excluding those exhibiting only minor cracking, were considered cracked.

Figure 5:
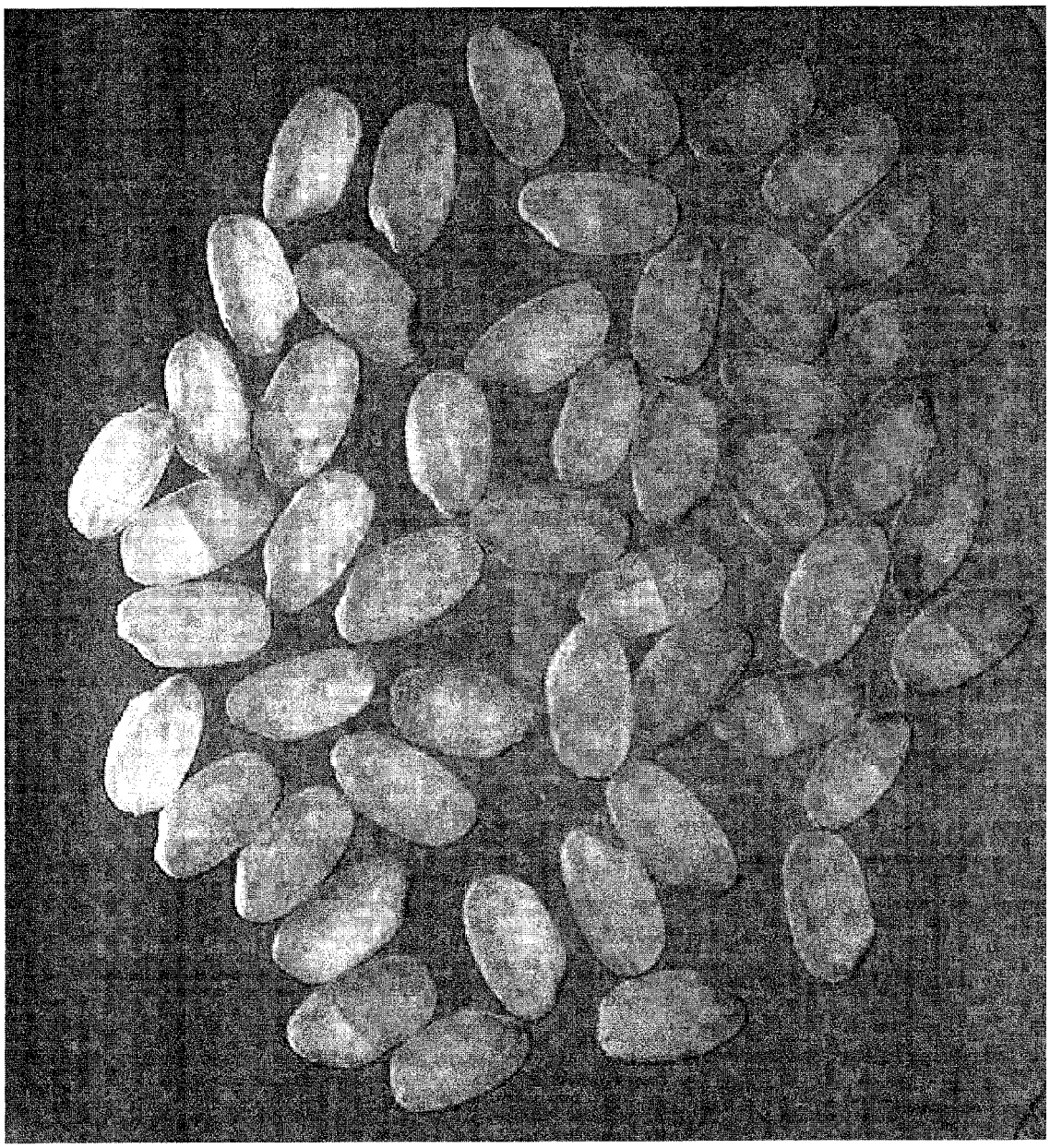
Figure 6:
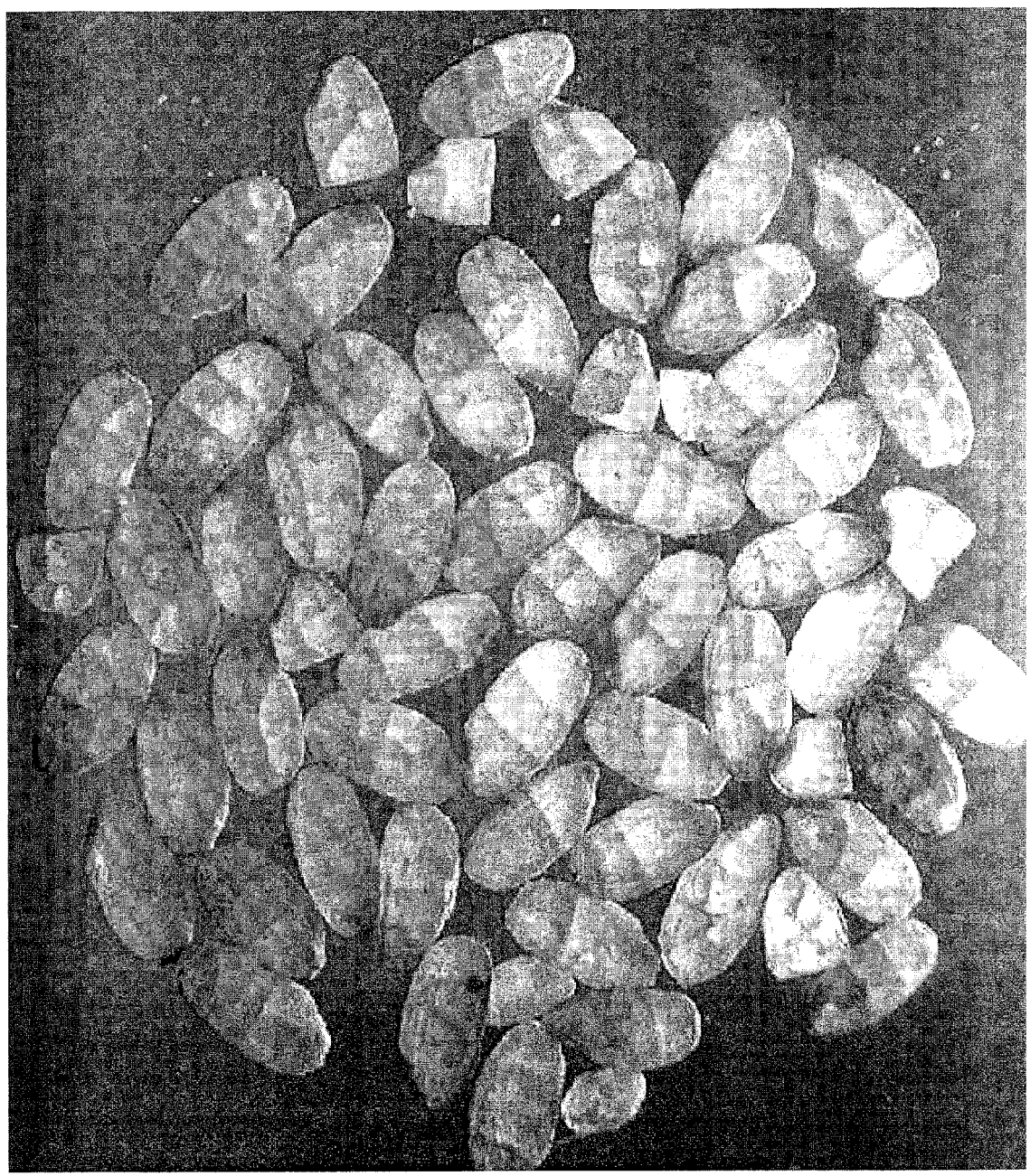

Table 2 shows the ratio of cracked rice. As shown by the table, the crack ratios of samples conforming to the invention of the present application were 50% or below. Only two of the samples obtained by comparative examples and commercial products had a ratio between 10 and 20%, and all others had a ratio above 50%. FIG. 5 shows an observed grain scope image of the sample obtained by Example 1, while FIG. 6 shows an observed image of the sample obtained by Comparative Example 1. Although the sample obtained by Example 1 shows little cracks, the sample obtained by Comparative Example 1 shows many cracks in rice grains.

Test Example 5

Observation of Cooked Condition and Taste Test Results 300 g each of the samples obtained by Examples 1, 2, 3, 4, 5, 6 and Comparative Example, as well as 15 selected brands of commercial germinated brown rice, were soaked for 0.5 hour and cooked in a normal mode using a household rice cooker with a normal amount of water. Taste test was conducted by testers within 10 to 30 minutes after completion of cooking. Evaluation method: Ten testers who had eaten germinated brown rice before were asked to taste and evaluate the samples without being told of their identity. Based on the taste of the comparative example sample as the reference (0 point), appearance, stickiness, texture, taste, fragrance and overall appeal were evaluated on a five-point scale. An evaluation score was calculated as an average of all scores given on the five evaluation levels of Equivalent (0), Slightly better (1), Good (2), Slightly poorer (−1) and Poor (−2). The testers also provided free comments on the samples.

The results of this sensory taste test are shown in Table 3.

TABLE 3

| Item | Puffiness (appearance) | Appearance | Fragrance | Stickiness | Texture | Taste | Overall evaluation of taste after cooking | Comment on taste |
| --- | --- | --- | --- | --- | --- | --- | --- | --- |
| Example 1 | No | 1 | 0.8 | 1.1 | 0.8 | 0.8 | 1 | Sweetness, stickiness and taste similar to white rice |
| Example 2 | No | 1 | 0.8 | 1.1 | 0.7 | 1.1 | 1.2 | Sweetness, stickiness and taste similar to white rice |
| Example 3 | No | 1.2 | 0.7 | 1.1 | 0.8 | 1.2 | 1.1 | Sweetness, stickiness and taste similar to white rice |
| Example 4 | No | 1.1 | 0.7 | 0.8 | 0.6 | 1.1 | 1.1 | Sweetness, stickiness and taste similar to white rice |
| Example 5 | No | 1.1 | 0.9 | 0.8 | 0.8 | 1.1 | 1.2 | Sweetness, stickiness and taste similar to white rice |
| Example 6 | No | 1.1 | 1 | 0.9 | 0.9 | 1.1 | 1.1 | Sweetness, stickiness and taste similar to white rice |
| Comparative Example 1 | Some | 0.6 | 0.3 | 0.5 | 0.7 | 0.5 | 0.7 | Slightly collapsed, sweet, soft |
| Commercial Product C | No | −1.5 | −2.0 | −0.9 | −1.1 | −0.5 | −1.8 | Dark exterior, bacterial smell, bland taste, hard |
| Commercial Product D | No | 0.8 | −0.4 | 0.5 | −0.6 | −0.6 | −0.5 | Like brown rice, sweet, hard |
| Commercial Product E | No | −1.6 | −0.6 | 0.4 | −1.1 | −0.3 | −1.1 | Collapsed exterior, bran smell, acid smell, sweet and harsh taste, hard, sticky |
| Commercial Product F | Yes | 0.9 | −0.6 | 0.6 | −0.7 | −0.6 | −0.4 | Acid smell, alcohol smell, sweet, not sticky and dry |
| Commercial Product H | No | 1.0 | 0.2 | 0.5 | −0.8 | −0.7 | −0.4 | Hard, dry, dusty smell, sweet |
| Commercial Product M | Yes | 0.3 | −0.4 | −0.3 | −0.4 | −0.1 | −0.5 | Shiny, rice cake smell, too sticky, crushed |
| Commercial Product N | Yes | −0.4 | −0.5 | −0.8 | −0.4 | −0.8 | −0.7 | Dark, pickle smell, not sweet, dry |
| Commercial Product O | No | −2.0 | 0.0 | −0.6 | −2.0 | −0.5 | −1.4 | Collapsed, remaining skin |
| Commercial Product P | Yes | −0.8 | 0.4 | −0.8 | −1.1 | −0.9 | −0.6 | No body, distinctive taste, not sweet |
| Commercial Product Q | Yes | −1.4 | −0.2 | −1.5 | −1.2 | −1.1 | −0.7 | Acid smell, acidic taste, not sticky and dry |
| Commercial Product R | No | −0.8 | −2.0 | −2.0 | −1.9 | −1.6 | −2.0 | Hard, smell, foul smell, crumbly |
| Commercial Product T | Yes | 0.0 | −1.4 | −0.8 | −1.0 | −0.5 | −1.3 | Good appearance, no distinctive taste, not sticky and dry |
| Commercial Product U | Yes | −0.1 | −1.7 | −0.1 | −0.2 | 0.6 | −0.6 | Strong acid smell, shiny, like rice cake, not sticky and dry |
| Commercial Product V | Yes | −1.6 | −0.3 | −0.5 | 0.0 | 1.0 | −0.6 | Flattened, savory, no body, sweet |
| Commercial Product e | Yes | −1.7 | −2.15 | −1.1 | −1.7 | −0.6 | −2.2 | Collapsed, acid smell, harsh taste, grainy |

Overall Evaluation

The germinated brown rice samples conforming to the invention of the present application could be cooked under exactly the same conditions as white rice, and were found superior to the comparative example sample or commercial products in all aspects of appearance, stickiness, texture, taste, fragrance, and overall appeal. Also, the testers concluded that their sweetness, stickiness and tastiness were the same as those of white rice. These results confirm that the germinated brown rice proposed by the present invention has high appeal.

SUMMARY OF THE RESULTS

The invention of the present application focused on direct reducing sugar, a constituent of germinated brown rice that increases in the germinating process and which was given little attention before, and successfully fixed the direct reducing sugar content at high levels, while also fixing at high levels the content of sucrose in germinated brown rice that was also given little attention before, thereby successfully controlling and fixing at high levels the contents of these constituents that significantly affect the tastiness of germinated brown rice. The present invention also adds a technique to control water absorption ratio, which plays a key role in allowing brown rice to demonstrate the same cooking property as white rice when cooked together with white rice. Consequently, the present invention successfully provides germinated brown rice that suppresses deterioration in rice quality such as chipping, and thereby exhibits improved taste on the whole.

The germinated brown rice proposed by the invention of the present application has been confirmed to contain markedly higher levels of direct reducing sugar and sucrose compared to conventional germinated brown rice, to demonstrate favorable water absorption condition, and to provide superior taste after cooking.

The invention claimed is:

1. Germinated brown rice comprising:
   0.15 g to 0.35 g of a direct reducing sugar as dextrose per 100 g of the dry weight of germinated brown rice,
   0.5 g or more of sucrose per 100 g of the dry weight of germinated brown rice, and
   gelatinized alpha starch accounting for 9 to 40% of the total starch content as measured by the BAP method,
   the germination of said brown rice being stopped for cooking and eating.

2. The germinated brown rice according to claim 1, characterized in that the water content is between 10 and 20%.

3. The germinated brown rice according to claim 2, characterized in that the water absorption ratio after soaking for 24 hours in 30° C. water is 35 to 60 percent by weight.

4. The germinated brown rice according to claim 3, wherein cracked rice accounts for 50% or below of the total rice.

5. The germinated brown rice according to claim 4, for cooking combined with white rice.

6. The germinated brown rice according to claim 1, wherein cracked rice accounts for 50% or below of the total rice.

7. The germinated brown rice according to claim 6, for cooking combined with white rice.

8. The germinated brown rice according to claim 1, wherein the sucrose content is 0.5 to 1.2 g per 100 g of the dry weight of germinated brown rice.

9. The germinated brown rice according to claim 8, wherein the sucrose content is 0.6 to 1.2 g per 100 g of the dry weight of germinated brown rice.

10. The germinated brown rice according to claim 1, wherein the direct reducing sugar content is 0.2 to 0.35 g per 100 g of the dry weight of germinated brown rice.

* * * * *

UNITED STATES PATENT AND TRADEMARK OFFICE
CERTIFICATE OF CORRECTION

| | | |
|---|---|---|
| PATENT NO. | : 7,935,369 B2 | |
| APPLICATION NO. | : 11/568850 | |
| DATED | : May 3, 2011 | |
| INVENTOR(S) | : Hiroto Shinmura et al. | |

It is certified that error appears in the above-identified patent and that said Letters Patent is hereby corrected as shown below:

Title page Column 2, line 19, under Other Publications, change "Temoerature" to --Temperature--.

Column 8, line 54, change "ater" to --Water--.

Column 12, line 33, change "<Sucrcrose" to --<Sucrose--.

Column 12, line 34, change "Surose" to --Sucrose--.

Column 19, line 13, change "THE" to --TEST--.

Signed and Sealed this
Seventh Day of February, 2012

David J. Kappos
*Director of the United States Patent and Trademark Office*